UNITED STATES PATENT OFFICE.

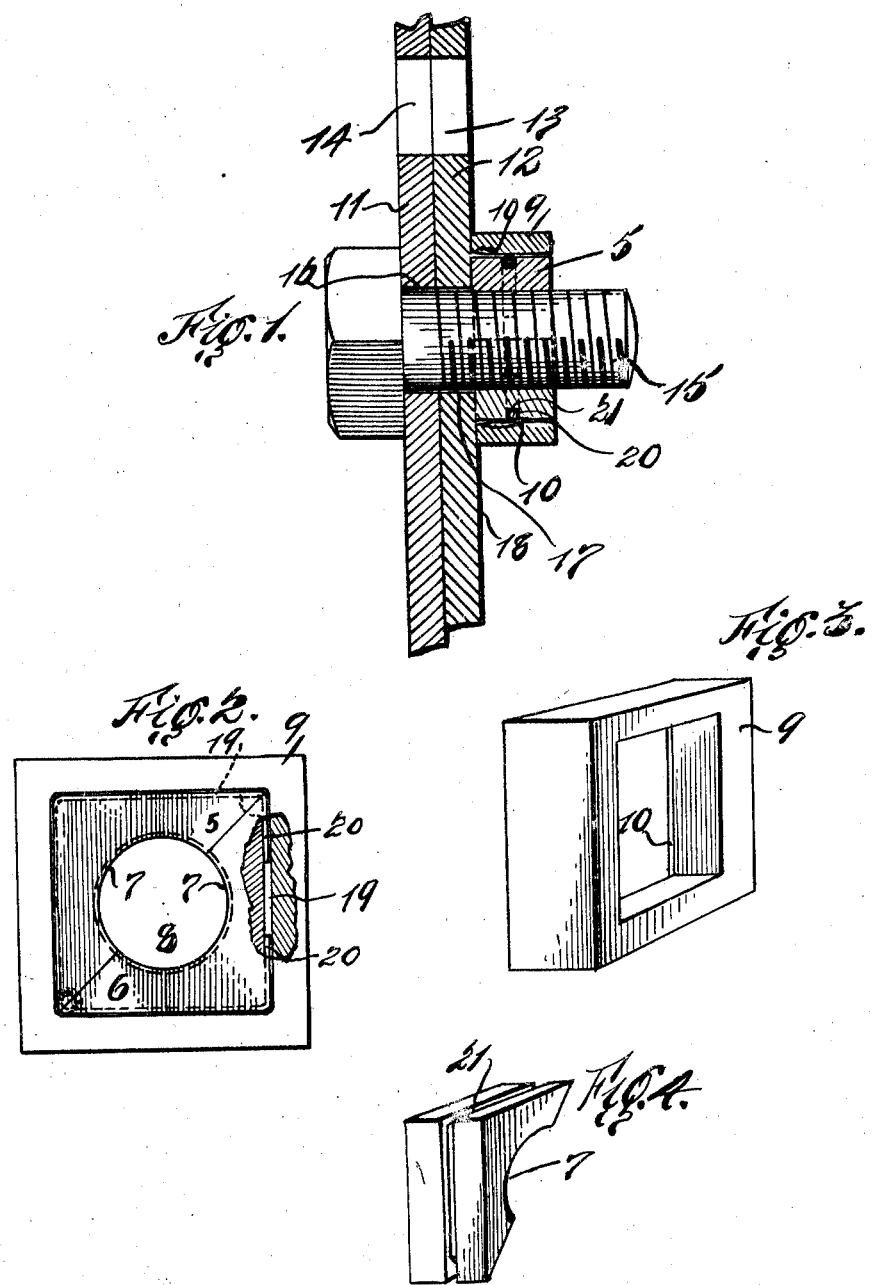

PETER JENSEN AND HANS HANSEN, OF TRENTON, NEW JERSEY.

QUICK-DETACHABLE NUT.

1,360,297.

Specification of Letters Patent.   Patented Nov. 30, 1920.

Application filed December 9, 1919. Serial No. 343,560.

*To all whom it may concern:*

Be it known that we, PETER JENSEN, a subject of the King of Denmark, and a resident of Trenton, county of Mercer, State of New Jersey, and HANS HANSEN, a citizen of the United States of America, and a resident of Trenton, county of Mercer, State of New Jersey, have jointly invented certain new and useful Improvements in Quick-Detachable Nuts, of which the following is a full, clear, and exact description.

This invention relates to improvements in nuts, the object being to provide a quick detachable and attachable nut, that is to say, a nut that can be applied to a bolt or similar element without the necessity of screwing the nut on from the end of the threaded element. Our improved nut is arranged to be applied to a threaded element intermediate the ends of the threaded portion and at a point adjacent the element or elements to be secured after the threaded element has been passed through a suitable opening in the element or elements to be secured.

Our improved nut is designed for construction purposes, that it to say, to secure parts of a structure, such as plates of a vessel, beams of a building, or parts of machine together, to hold same until the final securing elements, such as rivets or bolts, are applied. In order to save time we have designed a nut that can be applied to a bolt (for instance), without screwing same onto the bolt, or that can be removed without unscrewing same. Much time will be saved by the use of our improved nut, as it can be applied to a bolt or removed therefrom in less time than it takes to apply or remove a nut by means of a wrench. Our improved nut is not limited for use to temporarily secure parts together, but may be used as a permanent fixture, if desired.

We will now describe our invention in detail, the novel features of which we will point out in the appended claims, with reference to the accompanying drawing, wherein:—

Figure 1 is a diagrammatic sectional view of two plates, secured together by means of a bolt having our improved nut applied thereto, the nut being illustrated in section;

Fig. 2 is a detail face view of the nut;

Fig. 3 is a perspective view of the retaining frame which forms part of the nut; and Fig. 4 is a perspective view of one of the block members of the nut.

Our improved nut consists of a plurality of block members 5 and 6, each of which is provided with a threaded semi-circular recess 7, said recesses forming a complete cylindrical threaded bore 8 when the blocks are assembled as indicated in Fig. 2.

To maintain the blocks assembled when in use, we provide a frame or box 9 arranged to be slipped over the blocks, and to contact with the outer surface of each wall of the block, as indicated in Figs. 1 and 2. The inside walls of the frame 9 may (for a very short distance) be slightly tapered, as indicated at 10 in Fig. 3, to facilitate the application or removal of the frame or box 9.

Should we desire to secure together plates, such as are indicated by 11 and 12 (Fig. 1), which are to be finally riveted or bolted together, so as to cause openings, such as 13 and 14 to aline, and to remain in alinement until enough rivets or bolts have been applied to hold said plates, we pass a bolt, such as is indicated by 15, through similar openings 16 and 17, and apply our improved nut. To apply the nut the blocks 5 and 6 would be placed on the bolt, adjacent the surface 18 of the plate 12, that is to say, the threaded recesses 7 would be caused to engage the threads of the bolt at a point close to the plate 12. After the blocks have been applied, the frame or box 9 is slipped over the blocks, thereby holding same in assembled condition, after which a wrench will be used to tighten the nut in the usual manner; as a result of such tightening, the nut sections or members 5 and 6 will tend to expand or rather separate, thus jamming against the frame or box and thereby preventing premature loosening.

When the bolt 15 is to be removed, after having served its purpose, the frame or box 9 can be removed from the blocks, after which said blocks can be removed from the bolt, and the bolt removed from the plates. By means of our improved nut a wrench is not necessary excepting to slightly release same before the frame is removed, or to tighten the same after it is applied.

While we have illustrated the nut as square, it can be made hexagonal if desirable.

In order that the blocks 5 and 6 may be maintained separably connected, that is to say, in order that they can be kept in proper juxtaposition at all times and yet separable or capable of being spread apart to be slipped over a bolt, we employ a spring 19, the arms 20 of which snugly fit in a groove 21 in the outside wall of the blocks.

Having described our invention, what we claim and desire to secure by Letters Patent, is:—

A nut consisting of a plurality of separate blocks having threads to engage the threads of a bolt, a spring to maintain the blocks separably connected but closed, and a frame or box arranged to be slipped over the blocks to lock the same against separation, the blocks having a groove to receive the arms of the spring, said spring passing around said blocks intermediate the faces thereof.

PETER JENSEN.
HANS HANSEN.